Oct. 7, 1941.  E. MILLER  2,258,332
MANUFACTURE OF GOLF BALLS AND THE LIKE
Filed Sept. 25, 1937
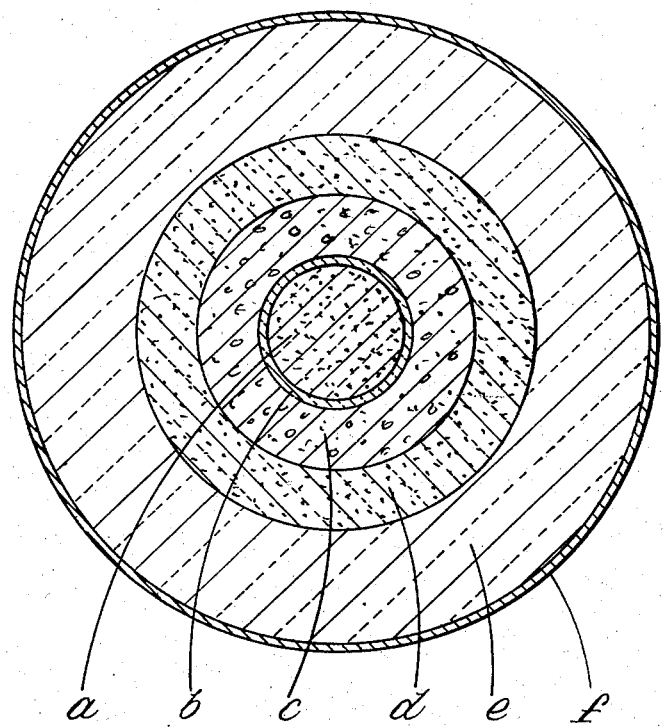
INVENTOR
ELLIS MILLER
BY
ATTORNEY Patented Oct. 7, 1941

2,258,332

UNITED STATES PATENT OFFICE 2,258,332

MANUFACTURE OF GOLF BALLS AND THE LIKE

Ellis Miller, Brussels, Belgium

Application September 25, 1937, Serial No. 165,642
In Great Britain September 8, 1937

6 Claims. (Cl. 273—62)

In the manufacture of golf and like balls it is known to provide a core of rubber or similar material which is wound around with rubber thread or tape, under tension, to the required size and afterwards enclosed in a gutta percha or like cover which is vulcanized in position.

The object of the present invention is to provide an improved golf or like ball which will have great steadiness in flight and when rolling on the ground, for which purpose, and in accordance with this invention a ball has a core consisting of a mixture of rubber, granulated nickel, the granules of which are in the form of fine globules, and kauri resin. Preferably this core is enclosed first in a layer of rubber, then in a mixture of granulated cork, preferably paraffin treated, rubber and kauri resin, then in a layer consisting of a mixture of rubber, granulated nickel and kauri resin, and the core thus produced is afterwards wound and covered in the usual manner.

The layer of rubber, granulated nickel and kauri resin, and the core proper of the same mixture are preferably prepared by heating rubber and kauri resin to about 130° C., adding granulated pure nickel, stirring the mixture so as to secure a uniform density throughout the mass, and then moulding. The layer of paraffin treated granulated cork, rubber and kauri resin preferably consists of finely granulated cork the surface of which is impregnated with paraffin wax, rubber and a small quantity of kauri resin to serve as a binder. This acts as a cushion around the core proper.

One form of golf ball made according to the present invention is illustrated by the accompanying drawing which is a central section.

$a$ is the core proper 9.0 mm. in diameter, weighing 1.7 grammes and consisting of a mixture of rubber, granulated pure nickel and kauri resin, prepared as above. $b$ is a surrounding layer of rubber which is 0.5 mm. thick and weighs 0.5 gramme. $c$ is a second surrounding layer consisting of finely granulated cork superficially impregnated with paraffin wax mixed with rubber and a small quantity of kauri resin as a binder and heated to fuse the kauri resin; this layer is 4 mm. thick and weighs 2 grammes, bringing up the diameter of the core to 18 mm. $d$ is a third surrounding layer consisting of the same mixture as the core proper. The weight of nickel employed in the layer $d$ depends on requirements and may be such that the weight of the layer $d$ is from, say, 11.0 grammes to, say, 15.0 grammes. The mixture is applied by means of a mould, the core being disposed centrally therein and the diameter of the core is thus brought up to 26 mm., after which it is wound with rubber thread or tape $e$ and covered, as at $f$, in the usual manner.

It is to be understood that the proportions of the materials employed in the core proper and in the respective layers and the thickness of the layers may be varied according to requirements.

I claim:

1. A ball having a solid, substantially homogeneous molded core proper consisting of a mixture of rubber, granulated pure, elemental nickel and kauri resin.

2. A ball having a solid, substantially homogeneous molded core proper consisting of a mixture of rubber, granulated pure, elemental nickel and kauri resin surrounded by a layer of rubber.

3. A ball having a solid, substantially homogeneous molded core proper consisting of a mixture of rubber, granulated pure, elemental nickel and kauri resin surrounded by successive molded layers of ($a$) rubber and ($b$) a mixture of granulated cork, rubber and kauri resin.

4. A ball having a solid, substantially homogeneous molded core proper consisting of a mixture of rubber, granulated pure, elemental nickel and kauri resin surrounded by successive molded layers of ($a$) rubber and ($b$) a mixture of granulated cork, rubber and kauri resin, the granulated cork being paraffin treated.

5. A ball having a solid, substantially homogeneous molded core proper consisting of a mixture of rubber, granulated pure, elemental nickel and kauri resin surrounded by successive molded layers of ($a$) rubber, ($b$) a mixture of granulated cork, rubber and kauri resin and ($c$) a mixture of rubber, granulated nickel and kauri resin.

6. A ball having a solid, substantially homogeneous molded core proper consisting of a mixture of rubber, granulated pure, elemental nickel and kauri resin surrounded by successive molded layers of ($a$) rubber, ($b$) a mixture of granulated cork, rubber and kauri resin, ($c$) a mixture of rubber, granulated nickel and kauri resin, ($d$) strip rubber wound under tension and ($e$) gutta percha constituting an outer cover.

ELLIS MILLER.